United States Patent [19]
Watanabe et al.

[11] 3,875,580
[45] Apr. 1, 1975

[54] STRUCTURE FOR PREVENTING FAULTY CAMERA OPERATION

[75] Inventors: Koichiro Watanabe, Funabashi; Fumio Urano, Wako, both of Japan

[73] Assignee: Asahi Kogaku Kogyo Kabushiki Kaisha, Itabashi-ku, Tokyo-to, Japan

[22] Filed: May 23, 1973

[21] Appl. No.: 363,127

[30] Foreign Application Priority Data
May 31, 1972 Japan.............................. 47-54026

[52] U.S. Cl............................... 354/268, 354/202
[51] Int. Cl............................... G03b 17/38
[58] Field of Search.......... 95/11 R, 31 EL, 31 AC, 95/31 FL, 53 E, 57, 42; 354/268, 202, 266

[56] References Cited
UNITED STATES PATENTS

| | | | |
|---|---|---|---|
| 2,539,499 | 1/1951 | Walters et al............................ | 95/42 |
| 3,535,991 | 10/1970 | Kitai................................... | 95/11 R |
| 3,601,019 | 8/1971 | Kitai................................... | 95/53 E X |

FOREIGN PATENTS OR APPLICATIONS

| | | | |
|---|---|---|---|
| 1,153,744 | 5/1969 | United Kingdom................ | 95/53 E |

*Primary Examiner*—Samuel S. Matthews
*Assistant Examiner*—Kenneth C. Hutchison
*Attorney, Agent, or Firm*—Steinberg & Blake

[57] ABSTRACT

A camera having a structure which prevents operation of the camera if structure thereof is not in proper operating condition. The camera structure includes an electromagnet as well as an armature which has an attracted position when the electromagnet is energized and which is released for movement to a rest position when the electromagnet becomes unenergized. A spring force is applied to the armature to urge it toward its rest position, and the electromagnet must exert a force at least equal to or greater than the spring force in order to place the armature in its attracted position and to hold it in this position. A blocking structure is movable between blocking and non-blocking positions, this blocking structure coacting with the armature to assume the blocking position when the armature is in its rest position and the non-blocking position when the armature is in its attracted position. A camera element moves along a predetermined path during normal camera operation, and the blocking structure when in its blocking position extends across this path to prevent movement of the camera element so that if the electromagnet cannot exert the force required to overcome the spring force the camera element will be blocked, thus preventing faulty camera operation.

5 Claims, 9 Drawing Figures

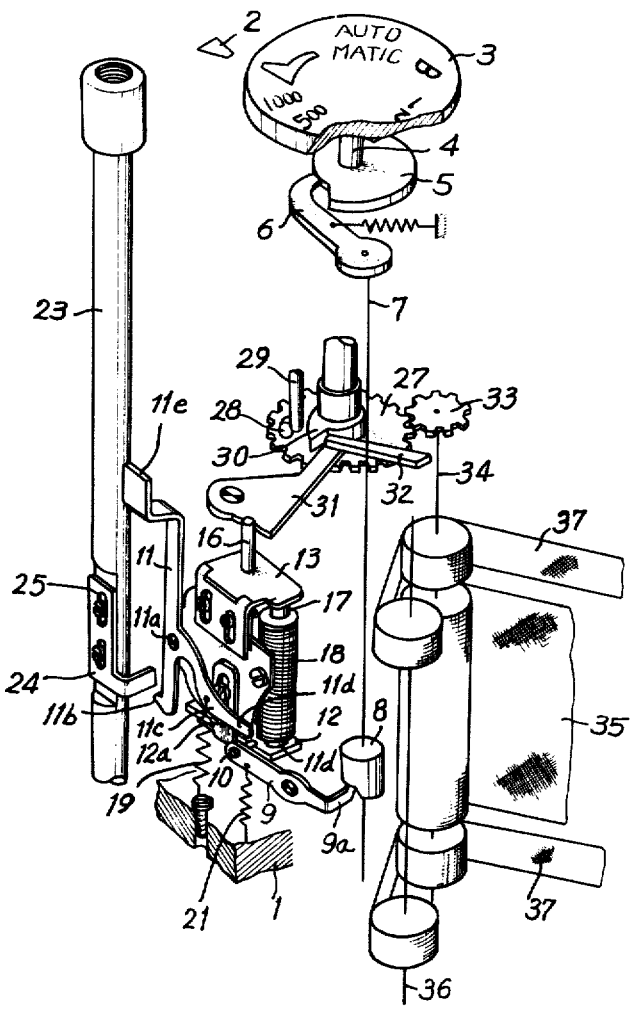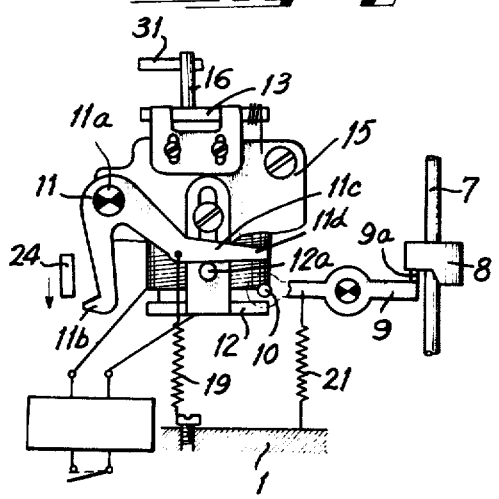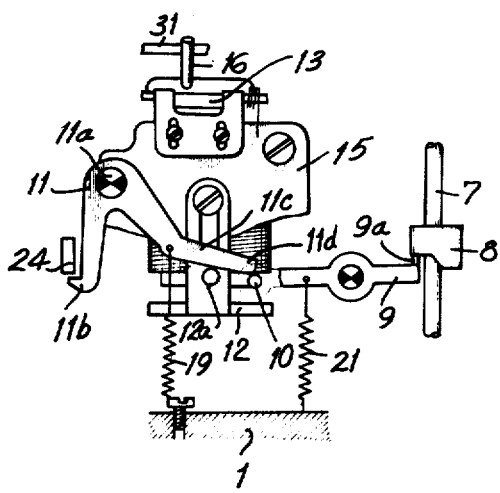

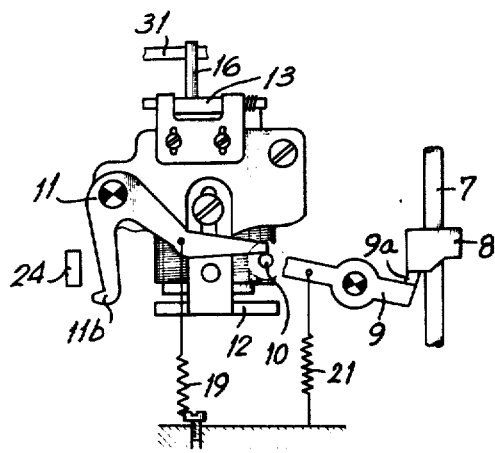
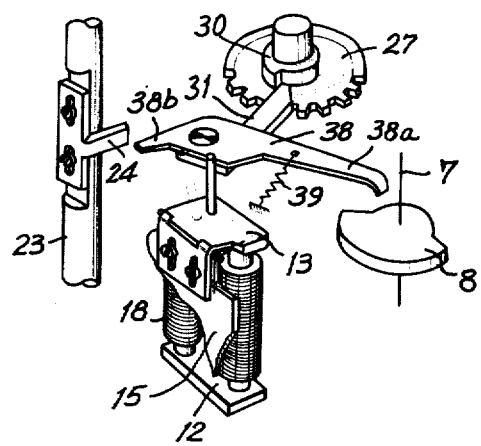
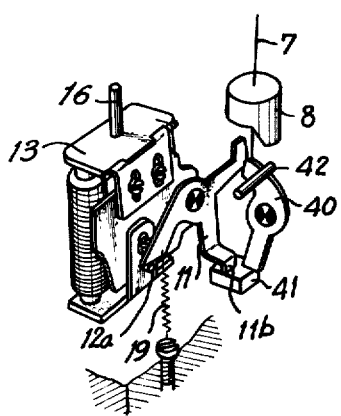
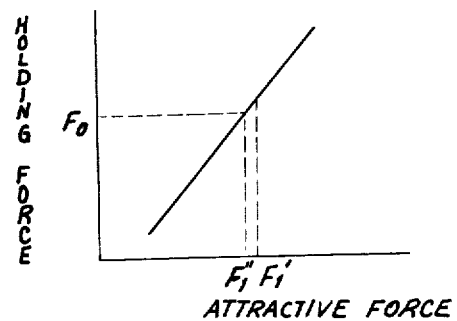
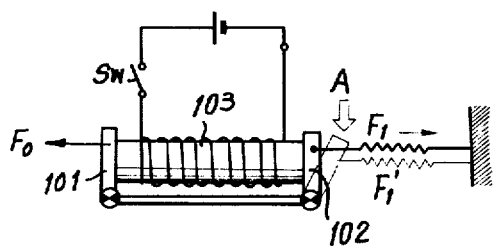
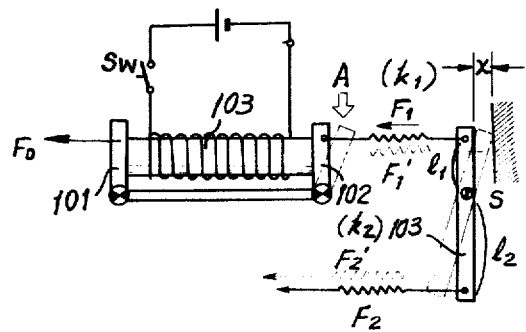

STRUCTURE FOR PREVENTING FAULTY CAMERA OPERATION

BACKGROUND OF THE INVENTION

The present invention relates to cameras.

In particular, the present invention relates to cameras provided with electrical structure.

Cameras of the this type have in addition to the electrical structure an energy source for operation of the electrical structure, this electrical structure being used not only in connection with exposure of film but also in connection with operations in preparations for exposure of film. Such cameras may have, for example, electronic circuits which automatically determined when the camera shutter closes so as to determine in this way the exposure time.

It is conventional to provide cameras of the above general type with devices capable of checking whether or not on the one hand a battery is in the camera to provide the required energy and on the other hand if the battery is indeed in the camera whether the battery is exhausted. Thus, it is conventional to provide cameras with checking devices which are capable of checking whether a battery is in the camera and whether the battery has sufficient energy to provide the required operation. Thus it becomes possible to avoid improper operation after operating such a battery checking device.

However, expedients of this latter type are attended by certain unavoidable inconveniences. For example the camera operator may forget to check the condition of the battery or if there is indeed a battery in the camera. In addition the checking operations involve a certain amount of inconvenience. Of even greater importance, however, is the fact that because of such operations, especially if they indicate that the battery must be changed or introduced into the camera, the opportunity to take a photograph may pass, so that a valuable subject for a photograph is lost to the photographer.

A further serious disadvantage of conventional structures of the above type resides in the fact that such battery checking devices are limited only to information with respect to the battery. It is at the present time impossible for the operator of a camera to detect improper operation of electrical structure in the camera which includes not only the electronic circuitry for the shutter but also converter structure for converting electrical signals into mechanical operations. Structures of this latter type can fail to operate properly because of erroneous operation of switches, breaking of electrical wires, and other deterioration of the electrical structure, particularly in connection with conversion of electrical signals into mechanical operations.

SUMMARY OF THE INVENTION

It is accordingly a primary object of the present invention to provide a camera with structure which will avoid the above drawbacks.

Thus, it is an object of the present invention to provide a structure which will automatically prevent camera operation in the event that electrical structure of the camera is not in proper operating condition.

Furthermore, it is an object of the present invention to provide a construction of the above type which is capable of indicating to the operator when the electrical structure is not in proper operating condition.

In addition, it is an object of the present invention to provide a construction of the above type which will operate in a highly reliable manner to prevent exposure of a film frame if the electrical camera structure is not in proper operating condition, so that in this way it is not possible to waste a film frame before determining that the camera structure is not operating properly.

In addition it is an object of the present invention to provide a camera of the above type which is capable of being operated either mechanically or electrically and which will automatically prevent camera operation only when electrical operation of the camera is selected.

It is in particular an object of the present invention to provide a structure of the above type which is especially suitable for use with single lens reflex cameras, especially of the type which have focal plane shutters.

In accordance with the invention the camera includes an electromagnet means and on armature means situated adjacent the electromagnet means to be held in an attracted position when the electromagnet means is energized, while when the electrogmagnet means becomes unenergized the armature means is released for movement to a rest position. A spring means acts on the armature means with a given force to urge the armature means to its rest position, so that the electromagnet means must exert a force at least equal to or greater than this given force in order to place the armature means in its attracted position and hold the armature means in its attracted position. A blocking means coacts with the armature means to assume a blocking position when the armature means is in its rest position and a non-blocking position when the armature means is in its attracted position. Th camera has an element which moves along a given path during normal camera operation, and the blocking means extends across this path when the blocking means is in its blocking position so as to prevent movement of the element and thus prevent normal camera operation when the armature means is in its attracted position. As a result, if it should happen that electrical conditions are such that the electromagnet means cannot exert the force required to situate the armature means in its attracted position, movement of the above camera element will be prevented by blocking means, so that faulty camera operation cannot occur.

BRIEF DESCRIPTION OF DRAWINGS

The invention is illustrated by way of example in the accompanying drawings which form part of this application and in which:

FIG. 1 is a schematic fragmentary perspective view of one possible embodiment of a structure according to the present invention shown in FIG. 1 in connection with a camera which has a focal plane shutter;

FIG. 2 is a schematic elevation showing the position which components of FIG. 1 occupy when an electromagnet means is energized;

FIG. 3 showss the position which the parts of FIG. 2 assume when the electromagnet means is unenergized;

FIG. 4 illustrates the position which the parts of FIGS. 2 and 3 assume when the operator selects mechanical rather than electrical camera operation;

FIG. 5 is a fragmentary perspective illustration of another embodiment of the invention;

FIG. 6 is a fragmentary perspective illustration of a still further embodiment of a structure according to the invention;

FIG. 7 is a schematic representation of the principle of operation of the structure of the invention;

FIG. 8 is a schematic representation of the operating principle of the invention, when operations the reverse of those of FIG. 7 are provided; and FIG. 9 is a graph illustrating the relationship between the holding force and the attractive force of the electromagnet means.

DESCRIPTION OF PREFERREDD EMBODIMENTS

FIG. 1 illustrates an embodiment of the invention which prevents tripping of the camera shutter in the event that the electrical structure is not in proper operating condition, the structure being shown in FIG. 1 as forming part of a camera which has a focal plane shutter. In addition, the camera of FIG. 1 is adapted to be operated either electrically or mechanically. Thus, the mechanical operation is provided when the exposure time is to be manually determined while the electrical operation is provided for automatic determination of the exposure time.

As is shown at the upper part of FIG. 1, the camera has a rotary shutter dial 3 capable of being turned with respect to a stationary index 2 for the purpose of selecting a given exposure time, in connection with mechanical camera operation, or for the purpose of automatically determining the exposure time when the dial 3 is set at a position where the AUTOMATIC graduation thereof is in line with the index 2.

The rotary dial 3 is supported for rotary movement at an upper part of a camera body 1 which is fragmentarily illustrated in a partly sectional manner at the lower part of FIG. 1. Thus, when the AUTOMATIC graduation of the dial 3 is positioned in line with the index 2, the camera will automatically determine the exposure time while any other graduation of the dial 3 when placed in line with the graduation 2 will provide the selected exposure time due to mechanical camera operation. The dial 3 is fixed with a shaft 4 which is supported for rotary movement in a suitable bearing and which in turn is fixed with a cam 5 which thus turns with the dial 3.

Situated adjacent the cam 5 is a lever 6 which is urged by a spring into engagement with the camming periphery of the cam 5. This lever 6 is fixed to a shaft 7 which is also supported for rotation in any suitable manner. The shaft 7 fixedly carries a second cam 8 having a bottom camming surface. The lower camming surface of the cam 8 engages a free end of a further lever 9 supported for swinging movement in any suitable manner. A spring 21 is operatively connected with the lever 9 so as to urge the free end 9a thereof into engagement with the lower camming surface of the cam 8. The end of the lever 9 distant from the cam 8 fixedly carries an operating pin for the purpose referred to below.

The camera illustrated in FIG. 1 is provided with a conventional focal plane shutter which is fragmentarily illustrated. Thus, the focal plane shutter includes the rotary shaft 36 which is operatively connected with the leading curtain of the shutter. The leading curtain is provided with the illustrated tapes 37 which are wound onto the shaft 36. The shaft 36 is fixed with an unillustrated driving gear which carries a pin 29 which is fragmentarily shown and which extends downwardly from the driving gear for the leading curtain. The pin 29 is situated in line with a pin 28, so that the pins 28 and 29 are capable of engaging each other. This pin 28 is fixedly carried by and extends upwardly from a gear 27 which serves to drive the trailing shutter curtain. During cocking of the sutter in a well known manner, the pins 28 and 29 engage each other so that when the drive to the leading shutter operates to cock the shutter, the trailing curtain travels together with the leading curtain so that the shutter remains closed while it is cocked. In this way the trailing curtain driving gear rotates together with the leading curtain driving gear which is not illustrated and which carries the pin 29. When the shutter is tripped to make an exposure, only the leading curtain is released, and at this time the pin 29 moves away from the pin 28.

In order to prevent the trailing curtain from following the leading curtain when the shutter is opened to make exposure, the driving gear 27 fixedly carries a pawl 30 which is situated beyond the range of movement of the pin 29 so that the latter is free to turn without interference from the pawl 30. The driving gear 27 meshes with a gear 33 which is fixed to the shaft 34 on which the trailing curtain 35 is wound when the shutter is cocked. When the pawl 30 is released, an unillustrated spring drives the trailing curtain 35 to close the shutter and terminate the exposure.

A holding lever 32 is positioned with one end next to the pawl 30 so as to prevent rotation thereof, this holding lever 32 being controlled in an illustrated manner from the cam 5 and being used only when the dial 3 is set at a selected exposure time. When the dial 3 is set for automatic determination of the exposure time, the holding lever 32 is in a position where it has no influence on the pawl 30.

During automatic determination of the exposure time, holding lever 31 cooperates with the pawl 30. Thus this lever 31 will automatically release the trailing curtain to terminate the exposure after elapse of an exposure time which is automatically determined with the electrical structure of the camera. For this purpose, one edge of the holding lever 31 engages a pin 16 which projects from a swingable armature 13 which together with the pin 16 forms part of the armature means of the embodiment of FIG. 1. This armature means 13, 16 is swingably supported directly over an elongated electromagnet means 18 which is energized in a known way during exposure of film and which becomes unenergized in order to terminate an exposure. Thus, when the electromagnet means 18 becomes unenergized under these conditions the spring which urges the trailing curtain 35 to run down to the shutter-closing position will be capable of acting to turn the holding lever 31 which through the pin 16 will swing the armature 13 upwardly toward a rest position away from the attracted position thereof shown in FIG. 1, the armature 13 when in its attracted position which is shown in FIG. 1 holding the pin 16 in the vertical attitude illustrated in order to prevent the pawl 30 from swinging the lever 31. Thus, when the electromagnet means 18 is energized the core 17 thereof forcibly attracts the armature 13 from its rest position to its attracted position, with the result that the pin 16 forcibly holds the lever 31 in a position where a free end of the latter is in the path of turning movement of the pawl 30.

In the embodiment of the invention which is illustrated in FIG. 1, the armature means includes not only the upper swingable armature element 31 but also a lower armature portion 12 which is vertically movable in a direction parallel to the axis of the core 17. Thus it will be seen that the structure which pivotally supports the armature 13 is adjustably mounted on a stationary supporting plate 15 which in turn carries a screw extending through a vertical slot formed in an upwardly directed extension of the armature 12 so that the latter is in this way guided for vertical movement between an upper position which is illustrated in FIG. 2 and a lower position which is illustrated in FIG. 3. The upward movement of the lower armature portion 12 is limited by engagement of the lower armature portion 12 with the lower ends of the pair of parallel cores 17 upon energizing of the electromagnet means 18.

The armature portion 12 includes a pin 12a which also forms part of the armature means of this embodiment. A spring means 19 acts on the armature means through the pin 12a which is fixed to the armature portion 12. For this purpose the spring means 19 is directly connected with an extension of a lever 11 which is supported for swinging movement on a stationary pin 11a carried by the support plate 15. Thus, the intermediate part 11c of the lever 11 forms part of the spring means acting on the armature means to urge the latter toward the rest position thereof which is illustrated in FIG. 3. When the electromagnet means 18 is energized the armature portion 12 will be moved upwardly from the rest position of FIG. 3 to the attracted position of FIG. 2, with the result that the pin 12a will turn the lever 11 in a counterclockwise direction around the pin 11a from the position of FIG. 3 into the position of FIG. 2. The left part of the lever 11, as viewed in FIGS. 2 and 3, which extends downwardly from the pin 11a, forms a blocking means and has a blocking portion 11b in the form of a tooth projecting laterally from the lever 11. This blocking means has the blocking position illustrated in FIG. 3 when the armature means is in its rest position and a non-blocking position illustrated in FIG. 2 when the armature means is in its attracted position. In the illustrated example the camera includes an element 24 which moves along a predetermined path during normal camera operation. However, the blocking means 11b extends across the path of movement of element 24 when the armature means 12 is in its rest position shown in FIG. 3, so that the element 24 cannot move at this time, whereas when the armature means is in the engaged position illustrated in FIG. 2, the blocking means 11b is in its non-blocking position out of the path of movement of the camera element 24.

In the illustrated example the element 24 is fixed to a shutter-release rod 23 which is moved downwardly by the operator in order to trip the shutter and start an exposure. This element 24 is in the form of a plate having a projection in whose path of movement the blocking means is situated, and this plate is adjustably fixed to the plunger 23 by way of a suitable adjustable connecting structure 25.

The lever 11 has beyond its extension 11c which forms part of the spring means a free end portion 11d which is situated in the path of movement of the pin 10 for a purpose referred to below.

Thus, as was pointed out above, FIG. 2 shows the position which the parts assume when the electromagnet means is energized. Part of the structure of the lever 11 is omitted from FIG. 2 for the sake of simplicity. When the dial 3 is set for automatic exposure-time determination, the cam 8 has the position shown in FIG. 2, so that the pin 10 is in its lower position.

Upon energizing of the electromagnet means 18, the attractive force which is produced at the cores 17 depends upon the magnitude of various operating parameters such as the energizing current $i$, the number of windings $n$ of the coil around the cores 17, the diameter $d$ of the wire used in the winding, and the diameter $D$ of the wire convolutions, so that in accordance with all of these factors the electromagnet means will exert a given force of attraction on the armature means. Assuming that this force of attraction is sufficiently great to overcome the force of the spring means 19, the lever 11 will be swung to the position shown in FIG. 2 in a manner described above, so that the element 24 is free to move. With the parts in the position of FIG. 2 it is therefore possible for the camera to operate in the normal way.

If it should happen, however, that for any reason such as a faulty condition in the electrical structure, failure to locate a battery in the camera, an exhausted battery, or the like, the electromagnet means 18 is incapable of exerting the force required to place the parts in the position of FIG. 2, then the parts will remain in the position shown in FIG. 3. Thus, an exhausted battery, defective electronic components, broken coil components, or the like, will result in the condition illustrated in FIG. 3. The force of the spring 19 is preliminarily adjusted in such a way that the core 17 will be incapable of attracting the armature 12 when the holding force of the electromagnet means is not great enough to hold the trailing curtain 35 against running down to the closed position of the shutter during operation of the electronic circuitry which determines the exposure time. Thus, with the position of the parts shown in FIG. 3 where the pin 12a is in its lower position, the spring 19 holds the lever 11 in the position where the blocking means 11b is situated in the path of movement of the elements 24. As a result the operator cannot release the shutter when the dial 3 is set for automatic operation if because of a faulty camera condition the electromagnet means does not operate properly.

The relationship between the forces acting on the various operating elements during operation as described above is primarily illustrated in FIG. 7. Referring to FIG. 7 it will be seen that the electromagnet means 103 will become energized upon closing of the switch SW. As a result the electromagnet means will attract an armature means 102 from the dot-dash line rest position thereof to the illustrated solid line attracted position in opposition to the resilient force $F_1'$ exerted by the illustrated spring means. The force with which the electromagnet means 103 acts to hold the illustrated second armature 101 increases when the electromagnet means 103 places the armature 102 in its attracted position inasmuch as the magnetic lines of force extending through the pair of cores of the electromagnet means 103 form an uninterrupted magnetic path with the attracted armature. As a result of the substantially linear relationship between the attractive force of the electromagnet means and the holding force thereof, as shown in FIG. 9, the spring means may be adjusted so as to establish the relationship according to which $F_1'$ is equal to or greater than the attractive force $F_1''$, this latter relation being between the attractive force $F_1''$ which corresponds to the force $F_o$, shown at the lower left of FIG. 7, and the force $F_1'$, with $F_o$ being equal to or greater than $F_1$, resulting in the fact that $F_1'$ is overcome by or exceeded by the attractive force of the magnet so that the magnet will reliably hold the armature 101 when the magnet attracts the armature 102.

In the reverse situation, no force is available for holding the trailing shutter curtain when the magnet cannot attract the armature 102 so that the magnet does not operate properly, thus establishing a condition where the trailing shutter curtain is released to run down even if the exposure time is electrically determined. In the event that the armature 102 occupies the position illustrated in dot-dash lines in FIG. 7, namely its rest position, it is illustrated in the path of movement designated by the arrow A of a movable camera element which is required to move along the path shown by the arrow A during normal camera operation. Thus, this movement at this time will be blocked by the armature means 102 when it is in its rest position, so that in this way an improper operating condition is automatically detected by the photographer.

It is of course this concept of blocking normal movement of a camera element which is relied upon for the present invention and to provide the condition illustrated in FIG. 3.

FIG. 8 illustrates an arrangement where the spring action is the reverse of that illustrated in FIG. 7. Referring to FIG. 8, when the switch SW is closed with the armature 102 already in engagement with the core of the electromagnet, the release stroke is used to exert the force $F_1$ on the armature 102 in the direction in which the armature 102 is drawn away from the electromagnet means. The description above in connection with FIG. 7 is also applicable to the arrangement of FIG. 8 if the arrangement is such that a signal indicating normal operation is produced when the armature 102 is not pulled away from the electromagnet means while another signal will indicate an erroneous operating condition when the armature 102 is displaced to its rest position and away from the electromagent means.

As may be seen from FIG. 8, the illustrated lever 103' is supported for swinging movement intermediate its ends so that it has a pair of arms $1_1$ and $1_2$. The moment relationship is such that $1_1 \cdot F_1 = 1_2 \cdot F_2$, and this relationship is spontaneously or automatically established. After the lever 103' is rotated through the distance $x$ into engagement with a fixed surface S, this being the position of the lever 103' shown in dot-dash lines in FIG. 8, the only spring force which is exerted is the force $F_2'$. Thus, a signal may indicate whether the core of the electromagnet means holds the armature 102 until this point in time. Adjustment of the force $F_1$ so as to establish the relationship according to which $F_0$ is equal to or greater than $F_1$ enables the signal which indicates erroneous camera operation to be obtained without failure when the armature 101 cannot be held in its attracted position by the core of the electromagnet means.

FIG. 4 illustrates the position which the parts assume when the dial 3 has been positioned to provide a manually selected exposure time so that the mechanical operation will be used. In this condition the cam 8 is positioned as illustrated in FIG. 4. The mechanical shutter operating mechanism controls the structure in such a way that no electrical current flows with subsequent deenergizing of the electromagnet means. As is apparent from FIG. 4, the lever 9 is turned by the cam 8 so that the pin 10 is in its upper position, this turning of the lever 9 taking place in opposition to the spring 21.

The pin 10 extends beneath the free end 11d of the lever 11 so that the latter is swung by the pin 10 to the position illustrated in FIG. 4 where the blocking means 11b is in its non-blocking position. Thus, irrespective of whether the armature 12 is attracted by the electromagnet or not, the blocking means will be maintained in its non-blocking position so that there will be no interference with the movement of the element 24, and thus during mechanical operation the shutter can be released in the usual way. Of course, a mechanism which includes the lever 9 and the structure for adapting the parts to mechanical operation is not required in the case of a camera which operates only with electronic control of the exposure time.

Another embodiment of the invention is illustrated in FIG. 5 where a single movable armature portion 13 is provided for the armature means, this single swingable armature element 13 serving both for control of the trailing curtain as well as for providing the signal to determine the blocking or non-blocking position for the blocking means. Thus, with the embodiment of FIG. 5, the lower armature 12 is permanently secured in any suitable way to the lower ends of the cores 17 so as to form a permanent connection between the cores 17 at their lower end. A spring 39 which corresponds to the spring 19 is operatively connected with a structure which is capable of adjusting the force of the spring 39. This spring 39 is connected with a lever 38 which corresponds to the lever 11. Thus, the lever 38 has a free end 38a which is situated in the path of movement of the camming periphery of the cam 8. The other end 38b of the lever 38 forms the blocking means of this embodiment. Thus, the blocking end 38b of the lever 38 is capable of being located in a blocking position in the path of movement of element 24 or in a non-blocking position beyond the path of movement of the element 24. The armature means 13 of FIG. 5 includes the pin 16 which is fixed to the armature means for swinging movement therewith. When the pin 16 is in the illustrated solid line position, corresponding to the attracted position of the armature means, the blocking means 38b is situated in a non-blocking position out of the path of movement of element 24 so that the latter can move down with the rod 23. When the electromagnet means 18 is not energized, the pin 16 will occupy the dot-dash line position, as a result of the action of the spring 39, and at this time the blocking means 38b is situated in the path of movement of element 24 to prevent tripping of the shutter. Of course, the holding lever 31 swings about the same pivot as the lever 38 and coacts with the holding pawl 30 on the driving gear 27 in the manner shown in FIG. 5 and described above in connection with FIG. 1.

The above description has been provided with respect to embodiments where the signal which indicates improper magnet operation will prevent tripping of the shutter and will in this way prevent a photographing operation from being carried out. However, it is possible for the blocking means to operate on any camera element which moves through a given path during normal camera operation in such a way that this latter movement is prevented when the electrical structure is not in a proper operating condition. Thus, referring to FIG. 6, in the embodiment illustrated therein the element 41 is the camera element which moves along a given path during normal camera operation. This element 41 may be considered as being mounted on one end of a lever which is part of a transmission for the swingable mirror of the single lens reflex camera, this element 41 being held by the mirror locking lever 40 and if the electrical structure is not in proper operating condition also by the element 11 whose free end 11b as illustrated in FIG. 6 forms the blocking means of this embodiment. A pin 42 extends from the shutter-release rod and serves to unlock the element 41 from the locking effect of the lever 40, so that normally the mirror would swing in the normal way. If, however, the electrical structure is not in proper operating condition so that the electromagnet means cannot provide the required magnetic force, then the blocking means 11b will prevent element 41 from moving so that the camera mechanism cannot operate. Of course, if the armature 12 is properly attracted the lever 11 will be swung so as to displace the blocking means 11b away from the element 41 and thus normal operation of the camera can be carried out. In the same way, when mechanical shutter operation is selected the upper right free end of the lever 11, as shown in FIG. 6, will be directly engaged by the cam 8 so as to displace the blocking means 11b away from element 41 which now is not influenced by the blocking means. Thus, under these latter conditions, which is to say either when the armature 12 is in its attracted position or when the cam 8 displaces the blocking means 11b away from element 41, the latter will be controlled only by the lever 40 so that the mirror will be operated when released by the lever 40 in response to shutter operation.

It is possible in a similar manner for various other mechanisms of the camera to be prevented from operating in a normal manner as an indication of the fact that the electrical structure is not in its proper operating condition. For example, the element 41 may be considered as forming part of a structure which prevents the leading curtain of the shutter from being released if the electrical structure does not operate properly. Also the element 41 may be considered as forming part of a transmission from the film-transporting structure which is operated to advance a film frame to an exposure position. Thus is the element 41 is blocked it is not possible for the operator to transport the film in the camera so that there is absolutely no possibility of wasting a film frame.

It is also possible in accordance with the invention to provide an indicating means which will indicate to the operator that the camera is not in the proper operating condition. For this purpose, as may be seen from FIG. 1, the lever 11 has an extension provided with a free end 11e which is visible through a window in a wall of the camera, for example. When the blocking means 11b is in its blocking position the indicating free end 11e of the lever 11 is visible at the window, so that the operator knows when the shutter cannot be tripped that if the part 11e is visible it is the improper electrical condition of the camera which prevents the camera from being operated. On the other hand, when the blocking means 11b is in its non-blocking position, the part 11e is swung away from the window so that it is not visible and thus there is no indication of faulty camera operation.

Thus, as is apparent from the above, the signal resulting from operation of the electromagnet means corresponding to the final phase of conversion of an electrical signal into a mechanical operation will prevent any effective photographing operation from being carried out and enables any erroneous condition of the camera to be automatically indicated to the operator of the camera.

What is claimed is:

1. In a camera which can be operated mechanically as well as electrically, electromagnet means and armature means situated adjacent said electromagnet means to be situated thereby in an attracted position when said electromagnet means is energized and to be released for movement away from said attracted position to a rest position when said electromagnet means becomes unenergized, spring means acting on said armature means with a given force which resists movement of said armature means from said rest position to said attracted position thereof upon energizing of said electromagnet means, so that said electromagnet means when energized must exert a force at least equal to or greater than said given force to displace said armature means to said attracted position thereof, blocking means coacting with said armature means for assuming a blocking position when said armature means is in said rest position thereof and a non-blocking position when said armature means is in said attracted position thereof, and a camera element movable along a given path during normal camera operation, said blocking means when in said blocking position thereof extending across said path to prevent movement of said element along said path and thus prevent normal operation of the camera, so that unless said electromagnet means is capable of attracting said armature means to said attracted position thereof said blocking means will prevent normal operation of the camera, whereby a faulty camera condition which prevents said electromagnet means from exerting a force at least equal to or greater than said given force will prevent normal operation of the camera, selecting means for selecting between the mechanical and electrical operation, and cam means operatively connected with said selecting means and cooperating said said blocking means for automatically situating the latter in its non-blocking position when said selecting means is positioned to select mechanical operation, so that during mechanical operation the condition of the electrical structure is immaterial.

2. In a camera, electromagnet means and armature means situated adjacent said electromagnet means to be situated thereby in an attracted position when said electromagnet means is energized and to be released for movement away from said attracted position to a rest position when said electromagnet means becomes unenergized, spring means acting on said armature means with a given force which resists movement of said armature means from said rest position to said attracted position thereof upon energizing of said electromagnet means, so that said electromagnet means when energized must exert a force at least equal to or greater than said given force to displace said armature means to said attracted position thereof, blocking means coacting with said armature means for assuming a blocking position when said armature means is in said rest position thereof and a non-blocking position when said armature means is in said attracted position thereof, and a camera element movable along a given path during normal camera operation, said blocking means when in said blocking position thereof extending across said path to prevent movement of said element along said path and thus prevent normal operation of the camera, so that unless said electromagnet means is capable of attracting said armature means to said attracted position thereof said blocking means will prevent normal operation of the camera, whereby a faulty camera condition which prevents said electromagnet means from exerting a force at least equal to or greater than said given force will prevent normal operation of the camera, said electromagnet means having an elongated configuration and being provided with opposed ends, said armature means including a pair of armature portions respectively situated adjacent the opposed ends of said electromagnet means to be simultaneously attracted thereto when said armature means is in its attracted position while being released for movement away from said ends when said electromagnet means is deenergized.

3. The combination of claim 2 and wherein said armature means includes a single armature element movable between said attracted and rest positions, said armature means when in its attracted position displacing said blocking means to said non-blocking position thereof.

4. In a camera, electromagnet means and armature means situated adjacent said electromagnet means to be situated thereby in an attracted position when said electromagnet means is energized and to be released for movement away from said attracted position to a rest position when said electromagnet means becomes unenergized, spring means acting on said armature means with a given force which resists movement of said armature means from said rest position to said attracted position thereof upon energizng of said electromagnet means, so that said electromagnet means when energized must exert a force at least equal to or greater than said given force to displace said armature means to said attracted position thereof, blocking means co-acting with said armature means for assuming a blocking position when said armature means is in said rest position thereof and a non-blocking position when said armature means is in said attracted position thereof, and a camera element movable along a given path during normal camera operation, said blocking means when in said blocking position thereof extending across said path to prevent movement of said element along said path and thus prevent normal operation of the camera, so that unless said electromagnet means is capable of attracting said armature means to said attracted position thereof said blocking means will prevent normal operation of the camera, whereby a faulty camera condition which prevents said electromagnet means from exerting a force at least equal to or greater than said given force will prevent normal operation of the camera, said armature means and blocking means forming a pair of means each of which assumes one position when said electromagnet means cannot exert a force at least as great as said given force and another position when said electromagnet means can exert a force at least as great as said given force, and indicating means operatively connected with one of said pair of means for indicating when said one of said pair of means is in said one position, so that the operator of the camera will know through said indicating means that a camera fault exists to prevent proper camera operation.

5. The combination of claim 1 and wherein said camera has a focal plane shutter provided with leading and trailing curtains, and said armature means influencing the operation of said focal plane shutter in accordance with whether said armature means is in said attracted or rest position thereof.

* * * * *